Feb. 20, 1968 J. D. WILSON Re. 26,350

RECEPTACLE

Original Filed March 9, 1964

INVENTOR:
James D. Wilson
By Keith D. Beecher
Attorney

United States Patent Office

Re. 26,350
Reissued Feb. 20, 1968

26,350
RECEPTACLE

James D. Wilson, Long Beach, Calif., assignor to Banner Metals, Inc., Compton, Calif., a corporation of Ohio Original No. 3,219,232, dated Nov. 23, 1965, Ser. No. 350,246, Mar. 9, 1964. Application for reissue June 8, 1966, Ser. No. 562,972
6 Claims. (Cl. 220—97)

Matter enclosed in heavy brackets [ ] appears in the original patent but forms no part of this reissue specification; matter printed in italics indicates the additions made by reissue.

*ABSTRACT OF THE DISCLOSURE*

*This disclosure describes a receptacle for use, for example, in the bakery industry for transporting and displaying bakery products. The receptacle is composed of molded plastic material, and it is shaped to provide it with nestable-stackable features. That is, the receptacles may be stacked on top of one another when they are filled with merchandise, and may be nested down into one another when empty, so as to conserve space.*

The present invention relates to trays or receptacles which may, for example, be formed of plastic or sheet metal; the receptacles being constructed so that they may be stacked on one another when full of merchandise, and so that they may be nested down into one another when empty.

The receptacles of the invention are intended primarily for use in the food industry, although they have general application wherever space must be conserved in plants, trucks and stores, especially after the receptacles have been emptied.

The receptacles of the invention may be used, for example, in transporting and displaying bakery goods. For example, the receptacles may be loaded at the bakery and then stacked on top of one another. The stacked receptacles may then be transported to the retail store or market. They are then positioned in the store or market so that the merchandise therein may be displayed and purchased. When the receptacles are empty, they are nested down into one another for space conservation purposes, and are then returned to the bakery.

The particular nestable and stackable receptacle to be described herein is advantageous in that it is capable of being nested or stacked without the need for movable bails or other movable parts. Moreover, the improved receptacle to be described nests and stacks with like receptacles in vertical alignment for optimum space conservation when in either the loaded, stacked condition; or when in the empty, nested condition.

An object of the present invention is to provide an improved nestable and stackable receptacle which may be formed of molded plastic, or sheet metal, so as to be light, rugged and inexpensive in its construction.

Another object of the invention is to provide such an improved nestable and stackable receptacle which is capable of being stacked with other like receptacles into a rigid and stable tier; and of being nested with other like receptacles when empty, and without the need for movable bails or other movable parts.

Yet another object of the invention is to provide such an improved receptacle which is constructed so that the merchandise therein is readily accessible when the receptacle is stacked into a tier with other like receptacles, in that the merchandise may be removed from any of the stacked receptacles without disturbing the other receptacles in the tier.

A further object of the invention is to provide such an improved receptacle which is constructed to have end and side walls with regular and smooth inner surfaces, so that there is no tendency to crush soft merchandise, such as loaves of bread, which may be placed in the receptacle.

Yet another object of the invention is to provide such an improved nestable and stackable receptacle which may be manipulated from a stacked to a nested condition, and vice versa, with other like receptacles, by means of a simple operation, and without any need to rotate the receptacle relative to the other receptacles, or to manipulate the receptacle excessively.

Another object of the invention is to provide such an improved nestable and stackable receptacle which is constructed to have a relatively small differential between its inner and outer dimensions, as compared with other receptacles of the same general type, so that waste space is reduced to a minimum.

Other objects and advantages of the invention will become apparent from a consideration of the accompanying drawings, in which.

Figure 1:
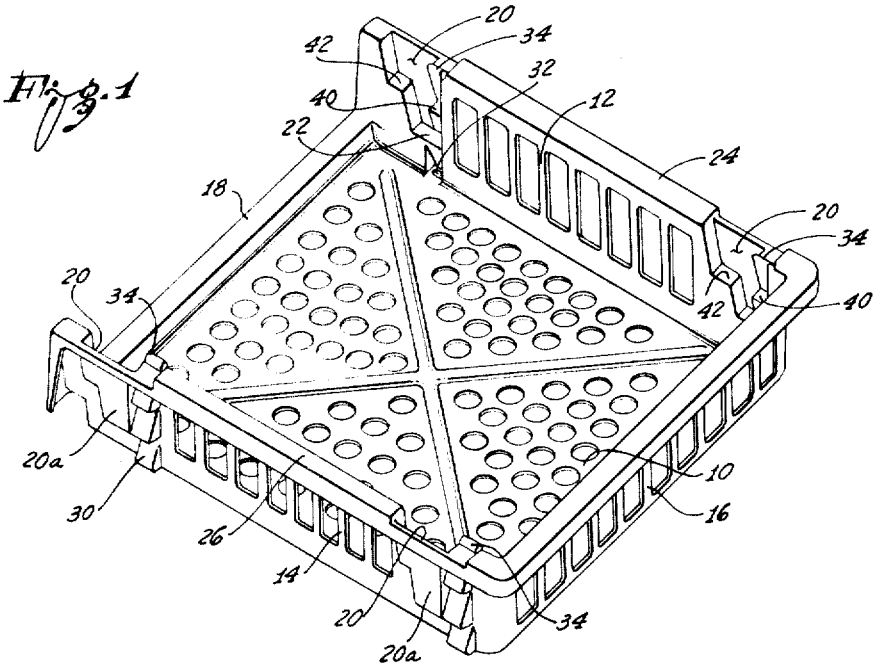
FIGURE 1 is a top perspective view of a receptacle constructed in accordance with one embodiment of the invention.

As mentioned above, the improved receptacle of the present invention may be composed of a molded plastic or sheet metal construction. With such a construction, the bottom and walls of the receptacle are formed integral as a one-piece structure. When it is made of plastic, the receptacle can be formed by a usual plastic molding operation. In the construction of the receptacle, the sides and bottom may be apertured, as shown, to reduce the weight of the receptacle, and also to enable the contents of the receptacle to be observable from the exterior of the receptacle.

As shown in the drawings, the nestable and stackable receptacle of the present invention includes a bottom 10. It also includes a pair of side walls 12 and 14 extending upwardly from the bottom, and a pair of end walls 16 and 18. The end walls 16 and 18 also extend upwardly from the bottom, and the walls 12, 14, 16 and 18 define an open top for the receptacle.

As shown in the drawing, the wall 18 has a fore-shortened height, so as to permit access to the interior of the receptacle. This means that when a plurality of like receptacles are stacked on one another, the merchandise in the individual receptacles can be removed, without disturbing the stack or tier.

In accordance with the invention, the sides are configured so that a pair of vertically extending channels 20 are formed in each of the side walls 12 and 14 to be respectively adjacent the corners of the receptacle. These channels are formed in the internal surface of each of the side walls, and each has a lower end portion which defines a shoulder 22. In each channel 20, the shoulder 22 is displaced upwardly from the bottom 10 of the receptacle. Each of the sides 12 and 14 has an upper edge, these being designated 24 and 26 respectively. The upper edges 24 and 26 extend from one side of the corresponding channels 20 to overlie a portion of each channel. The remaining portion of the channel defines a vertical clearway which extends down from the top of the receptacle to the shoulder 22. The channel 20 is formed, in each instance, by configuring the plastic, or sheet metal, to have an outwardly projecting portion 20a, as shown, for example, in FIGURES 1 and 2.

The bottom 10 has a plurality of outwardly extending portions 30 in axial alignment with respective portions of the top edges which overlie corresponding portions of the vertical channels 20. As illustrated, each of the outwardly extending portions 30 has a slot 32 formed in it, and these slots receive corresponding projections 34 which extend upwardly from the overlying portions of the top edges 24 and 26 adjacent the clearway of each channel 20.

Figure 2:
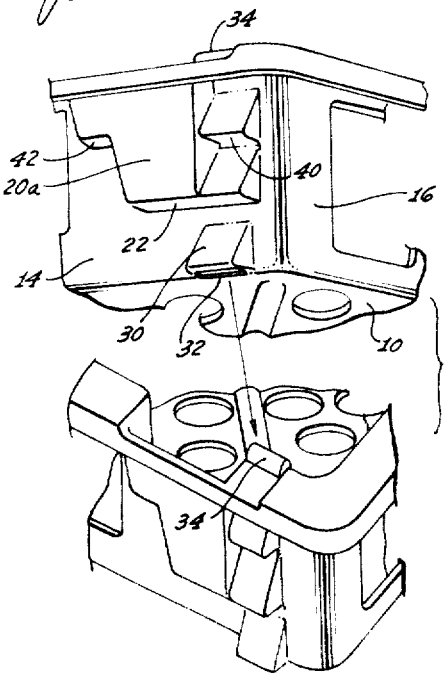
FIGURE 2 is a fragmentary perspective view of a corner of the receptacle of FIGURE 1 and illustrating how the receptacle may be stacked on a like receptacle.

Further in accordance with the illustrated embodiment of the invention, each vertical channel 20 is configured (as best shown in FIGURE 2) to incorporate an intermediate shoulder 40 which extends partially across the channel to one side of the aforesaid clearway, and in axial alignment with the respective portions of the aforesaid upper edges, which overlie a part of each channel 20.

The side of the clearway portion of each channel 20 remote from the shoulder 40 is formed to have a shoulder 42. This shoulder facilitates the manipulation of the receptacles when they are moved from a stacked to a nested position, and the shoulders 40 and 42 in each of the channels 20 also permit trays to be suspended in the illustrated receptacle. Such trays are provided with ears which extend into the channels 20 and engage the shoulders 40 and 42 at each corner, so as to constitute an intermediate shelf in the receptacle, when such is desired.

It will be appreciated that when one receptacle is to be stacked on another, the upper receptacle is merely placed over the lower receptacle in position such that the upper projections 34 of the lower receptacle are received in the slots 32 of the upper receptacle (FIGURE 2). This provides for a rigid, firm and stable relationship between the two stacked receptacles, so that a plurality of like receptacles may be so stacked to form a stable and rigid tier. When the receptacles are in the stacked position, and as mentioned above, merchandise may be removed from any one of the receptacles without disturbing the tier, this being achieved through the open ends provided by the fore-shortened end wall 18.

Figure 3:
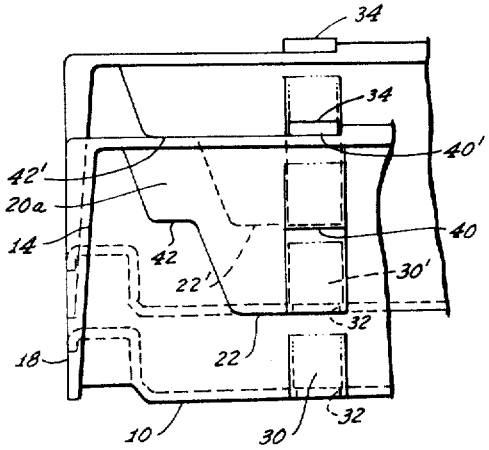
FIGURE 3 is a fragmentary view illustrating the manner the receptacle nests down into other like receptacles.

When an upper receptacle is to be nested down into a lower receptacle, the upper receptacle is moved upwardly from the lower receptacle so that its slots 32 are disengaged from the projections 34 of the lower receptacle. The upper receptacle is then moved horizontally towards the open fore-shortened end 18, so that its bottom projecting portions 30′ lie over the clearway portions of the corresponding channels 20. The upper receptacle can then be dropped down into the lower receptacle until its bottom projecting portions 30′ engage the corresponding shoulders 22 at the bottom of the channels in the lower receptacle (FIGURE 3). The upper receptacle is then moved into axail alignment with the lower receptacle, such that its shoulder 22′ moves along the shoulder 40 of the lower receptacle, and its projections 30′ move along the shoulder 22 of the lower receptacle. During this relationship, the shoulder 40′ of the upper receptacle engages the overlying portion of the upper edges of the lower receptacle.

In the manner described in the preceding paragraph, as many receptacles are desired may be nested into one another in a vertical stack. It will be appreciated that the receptacle described above may be stacked in vertical alignment so as to form a stable tier, and they may be nested in vertical alignment (FIGURE 3) so as to provide an optimum space conversing characteristic when nested.

Also, the configuration of the receptacle is such, and as best seen in FIGURE 1, that soft goods, such as loaves of bread, may be stored in the receptacle adjacent the side and end walls thereof without any tendency to crush the merchandise due to internal projections in the walls of the receptacles.

It will also be appreciated that the receptacles may be adjusted from a stacked to a nested position, merely by a slight manipulating motion, and without any need for rotation of one receptacle with respect to the other, or for other awkward nesting manipulations.

It will also be appreciated that the differential between the inner dimension and outer dimension of the receptacle is kept to a minimum, again to provide for optimum space usage.

While a particular embodiment of the invention has been shown and described, modifications may be made. It is intended to cover all such modifications as fall within the scope of the invention in the following claims.

What is claimed is:

1. A unitary nestable and stackle receptacle including: a bottom; side walls integral with said bottom and with one another, said side walls extending upwardly from said bottom and having an upper edge defining an open top for the receptacle; said side walls being shaped to define stacking and nesting means for the receptacle, and each of said stacking and nesting means projecting outwardly from the plane of the corresponding wall to define a support shoulder [parallel to the plane of said bottom and] spaced upwardly [therefrom] *from said bottom,* a channel extending to the upper edge of the corresponding wall, a first supporting member disposed [below and] to one side of said channel having a lower surface extending out from the plane of the corresponding side wall adjacent said bottom and said first supporting member extending upwardly towards said support shoulder with a taper which extends inwardly towards the plane of the corresponding side wall, a second supporting member disposed to one side of said channel in vertical alignment with said first supporting member and having an upper surface [formed by a portion of said support shoulder] and said second supporting member extending upwardly towards the upper edge of the corresponding side wall with a taper extending inwardly towards the plane of the corresponding side wall, and means defining an upper supporting member adjacent the upper edge of the corresponding side wall in vertical alignment with said lower surface of said first supporting member; whereby said lower surface of said first supporting member engages said upper supporting member when a pair of like receptacles are in a stacked position, and said lower surface of said first supporting member engages said upper surface of said second supporting member when a pair of like receptacles are in a nested position.

2. The receptacle defined in claim 1 which includes a third supporting member disposed to one side of said channel in vertical alignment with and above said first and second supporting members and having a lower surface extending out from the plane of the corresponding side wall to form an intermediate stacking member, and said third supporting member extending upwardly to the upper edge of said corresponding side wall with a taper extending inwardly towards the plane of the corresponding side wall.

3. The receptacle defined in claim 1 in which said bottom and side walls are formed of a molded plastic material.

4. The receptacle defined in claim 1 in which said lower surface of said first supporting member includes an aperture, and in which said upper supporting member has an upwardly projecting portion in vertical alignment with said aperture.

*5.* *A unitary nestable and stackable receptacle including: a bottom; side walls integral with said bottom and with one another, said side walls extending upwardly from said bottom and having an upper edge defining an open top for the receptacle; said side walls being shaped to define stacking and nesting means for the receptacle, and each of said stacking and nesting means projecting outwardly from the plane of the corresponding wall to define a support shoulder spaced upwardly from said bottom, a channel extending to the upper edge of the corresponding wall, a first supporting member disposed to one side of said channel having a lower surface extend-*

*ing out from the plane of the corresponding side wall adjacent said bottom, a second supporting member disposed to one side of said channel in vertical alignment with said first supporting member and having an upper surface, and means defining an upper supporting member adjacent the upper edge of the corresponding side wall in vertical alignment with said lower surface of said first supporting member; whereby said lower surface of said first supporting member engages said upper supporting member when a pair of like receptacles are in a stacked position, and said lower surface of said first supporting member engages said upper surface of said second supporting member when a pair of like receptacles are in a nested position.*

*6. A container adapted to be stacked with a container of identical shape or variably nested therein comprising, a bottom, a pair of opposed side walls sloping inwardly toward each other from top to bottom and joined at their lower edges to said bottom, a single rear end wall sloping inwardly from top to bottom and joining said opposed side walls to thereby form in combination with said bottom and side walls a merchandise transport and display tray; said side walls including variable nesting means formed on the inner and outer surfaces of said side walls; said variable nesting means comprising at least a pair of vertically disposed channels formed in each of*

*said side walls, said channels being recessed outwardly from the plane defined by each of said side walls, and including a plurality of vertically aligned protruding inner support shoulders extending inwardly from the outer wall of each of said channels, and at least one outer support shoulder positioned on the outside surface of the side walls immediately behind said inner support shoulders, said inner support shoulders providing a plurality of intermediate nesting levels so that the outer support shoulders of a similar container may be slidably engaged therewith to provide a desired predetermined space between the bottoms of nested containers related to the height of the merchandise to be transported and displaced in said container.*

References Cited

The following references, cited by the Examiner are of record in the patented file of this patent or the original patent.

UNITED STATES PATENTS

| | | | |
|---|---|---|---|
| 2,655,283 | 10/1953 | Moldt | 220—197 |
| 3,113,680 | 12/1963 | Frater | 211—126 |

THERON E. CONDON, *Primary Examiner.*

G. E. LOWRANCE, *Assistant Examiner.*